United States Patent [19]

Pons et al.

[11] Patent Number: 5,268,197
[45] Date of Patent: Dec. 7, 1993

[54] APPLICATION OF A PLASTIC DISPERSION AS COATING FOR INORGANIC AND ORGANIC PARTICLES

[75] Inventors: Dick A. Pons, Maassluis; Monique Van Der Heyden-Van Den Berg, Hoek van Holland, both of Netherlands

[73] Assignee: Stamicarbon B.V.

[21] Appl. No.: 844,484

[22] Filed: Mar. 4, 1992

[30] Foreign Application Priority Data

Mar. 4, 1991 [NL] Netherlands .................. 9100385

[51] Int. Cl.$^5$ ............................................. B05D 7/00
[52] U.S. Cl. .................................. 427/221; 427/212; 524/762; 524/819
[58] Field of Search ............ 427/212, 221; 524/819, 524/762

[56] References Cited

U.S. PATENT DOCUMENTS

| | | | |
|---|---|---|---|
| 3,758,334 | 9/1973 | Dehm | 427/221 |
| 4,101,490 | 7/1978 | Pons et al. | |
| 4,220,610 | 9/1980 | Durch et al. | 427/393.3 |
| 4,365,040 | 12/1982 | Eck et al. | 524/819 |
| 4,473,678 | 9/1984 | Fink et al. | 524/211 |
| 4,771,086 | 9/1988 | Martin et al. | |
| 4,950,709 | 8/1990 | Schuleter et al. | 524/162 |

FOREIGN PATENT DOCUMENTS 0439233  7/1991  European Pat. Off. .

*Primary Examiner*—Anthony McFarlane
*Attorney, Agent, or Firm*—Cushman, Darby & Cushman

[57] ABSTRACT

The invention relates to a method of coating inorganic and organic particles, such as pigment particles and colorant particles with a plastic dispersion.

The plastic dispersion is a dispersion of a polymer based on a. a vinyl monomer,
b. ($C_1$-$C_{12}$) alkyl (meth)acrylate, ($C_1$-$C_{12}$) dialkylitaconate, ($C_1$-$C_{12}$) dialkylfumarate, ($C_1$-$C_{12}$) dialkylmaleate, or a mixture thereof,
c. a phosphorus-containing compound and
d. 0–0.3% (wt) organic unsaturated mono, dicarboxylic acid or a mixture thereof.

8 Claims, No Drawings

APPLICATION OF A PLASTIC DISPERSION AS COATING FOR INORGANIC AND ORGANIC PARTICLES

The invention relates to a method of using a plastic dispersion as a coating for inorganic and organic particles, such as pigment particles and colorant particles.

The use of plastic dispersions as coatings for inorganic and organic particles, such as pigment particles and colorant particles, is described on page 165 of the Pigment Handbook (Volume III, by Temple C. Patton, 1973). Such pigment particles or colorant particles coated with plastic dispersions can be mixed into various plastics. After mixing with plastics, such coated pigment particles often cause problems owing to the formation of agglomerates. In general, the coated pigment particles are suited only for mixing with highly specific plastics. This factor explains why plastic dispersions are sought resulting in a good, homogeneous distribution of pigments and colorants in a plurality of plastics without agglomerates being formed.

SUMMARY OF THE INVENTION

The invention is characterized in that the plastic dispersion is a dispersion of a polymer based on
a. a vinyl monomer,
b. ($C_1$–$C_{12}$) alkyl (meth)acrylate, ($C_1$–$C_{12}$) dialkylitaconate, ($C_1$–$C_{12}$) dialkylfumarate, ($C_1$–$C_{12}$) dialkylmaleate or a mixture thereof,
c. a phosphorus-containing compound according to one of the formulas $(RO)_2PO(OH)$, $(RO)PO(OH)_2$ or a mixture thereof, wherein R represents an alcohol residue derived from an unsaturated polymerizable alcohol with 2–12 carbon atoms or wherein R represents a group A–B, where A is a residual acid derived from an unsaturated polymerizable carboxylic acid with 3–25 carbon atoms from the group consisting of acrylic acid, methacrylic acid, crotonic acid, monoesterified fumaric acid, monoesterified maleic acid and monoesterified itaconic acid and where B represents a bivalent residue derived from a diol, a phosphorus-containing compound according to the formula $(RO)(TO)PO(OH)$ or a mixture thereof, wherein R represents an alcohol residue derived from an unsaturated polymerizable alcohol with 2–12 carbon atoms or wherein R represents a group A–B where A is a residual acid derived from an unsaturated polymerizable carboxylic acid with 3–25 carbon atoms and B represents a bivalent residue derived from a diol, and wherein TO represents a residue derived from a branched or non-branched aliphatic alcohol with 6–22 carbon atoms or from a polyoxyalkylated alkylphenol with 7–30 carbon atoms or from an addition product of ethylene oxide to an alcohol with 6–22 carbon atoms or from an addition product of an alkylene oxide containing at least 3 carbon atoms to an alcohol with 1–15 carbon atoms and
d. 0–0.3% (wt) organic unsaturated mono, dicarboxylic acid.

The method involves contacting organic or inorganic particles with the dispersion in order to form coated particles. The result is that pigment particles and colorant particles coated with a plastic dispersion are obtained that can be mixed with a plurality of plastics without agglomerates being formed.

DETAILED DESCRIPTION OF THE INVENTION

The plastic dispersion is preferably a dispersion of a polymer based on
a. 50–99% (wt) vinyl monomer,
b. 0–50% (wt) ($C_1$–$C_{12}$) alkyl (meth)acrylate, ($C_1$–$C_{12}$) dialkylitaconate, ($C_1$–$C_{12}$) dialkylfumarate, ($C_1$–$C_{12}$)dialkylmaleare or a mixture thereof, more preferably, 0.1–40% (wt),
c. 0,1–5% (wt) of a phosphorus-containing compound according to one of the formulas $(RO)_2PO(OH)$, $(RO)PO(OH)_2$, or a mixture thereof, wherein R represents an alcohol residue derived from an unsaturated polymerizable alcohol with 2–12 carbon atoms or R represents an AB group, where A is a residual acid derived from an unsaturated polymerizable carboxylic acid with 3–25 carbon atoms from the group formed by acrylic acid, methacrylic acid, crotonic acid, monoesterified fumaric acid, monoesterified maleic acid and monoesterified itaconic acid and where B represents a bivalent residue derived from a diol, a phosphorus-containing compound according to the formula $(RO)(TO)PO(OH)$ or a mixture thereof, wherein R represents an alcohol residue derived from an unsaturated polymerizable alcohol with 2–12 carbon atoms or wherein R represents an AB group where A is a residual acid derived from an unsaturated polymerizable carboxylic acid with 3–25 carbon atoms and B represents a bivalent residue derived from a diol, and wherein TO represents a residue derived from a branched or non-branched aliphatic alcohol with 6–22 carbon atoms or from a polyoxyalkylated alkylphenol with 7–30 carbon atoms or from an addition product of ethylene oxide to an alcohol with 6–22 carbon atoms or from an addition product of an alkylene oxide containing at least 3 carbon atoms to an alcohol with 1–15 carbon atoms and
d. 0–0.3% (wt) organic unsaturated mono, dicarboxylic acid or a mixture thereof, more preferably, 0.1–0.3% (wt).

The vinyl monomer can, for instance, be a vinylaromatic monomer, vinylacetate, vinylversatate, vinyllaurate or vinylcaprate. Preference is given to the use of a vinylaromatic monomer such as, for instance, styrene. Other suitable vinylaromatic monomers are, for instance, vinyltoluene and thylstyrene.

The preferred component b) is preferably ($C_1$–$C_{12}$) alkyl (meth) acrylate.

($C_1$–$C_{12}$) alkyl (meth)acrylate is preferably methyl (meth)acrylate. Other suitable ($C_1$–$C_{12}$) alkyl (meth)acrylates are, for instance, ethyl (meth)acrylate, butyl (meth)acrylate and 2-ethyl-hexyl (meth)acrylate.

Phosphorus-containing compounds according to one of the formulas $(RO)_2PO(OH)$, $(RO)PO(OH)_2$, or a mixture thereof are preferable used as component (c).

According to a preferred embodiment of the invention, the percentage by weight of organic unsaturated mono or dicarboxylic acid is virtually 0% (wt). If organic unsaturated mono or dicarboxylic acid is present, it is preferably (meth)acrylic acid.

In formulas $(RO)_2PO(OH)$ and $(RO)PO(OH)_2$, the RO group may be derived from an unsaturated polymerizable alcohol with 2–12 carbon atoms such as, for instance, allyl alcohol, crotyl alcohol, undecylene alcohol or cinnamyl alcohol. The RO group may further represent an A—B—O group wherein A is a residual acid derived from an unsaturated polymerizable carboxylic acid with 3-25 carbon atoms and wherein B is a residue derived from a bivalent alcohol. Examples of suitable carboxylic acids are acrylic acid, methacrylic acid and crotonic acid. Suitable also are monoesters of a dicarboxylic acid such as, for instance, fumaric acid, maleic acid and itaconic acid, and an alcohol with 1-20 carbon atoms such as, for instance, methanol, ethanol, propanol, butanol, heptanol, 2-ethylhexanol, decanol, tridecanol, cyclohexanol and benzyl alcohol. Examples of bivalent alcohols are the branched or non-branched aliphatic or cycloaliphatic diols with 2-20 carbon atoms such as, for instance, ethylene glycol, propylene glycol, 1,4-butanediol, 1,2-butanediol, 1,2-hexanediol, 1,2-decanediol, 1,2-dodecanediol and 1,4-bis(hydroxymethyl)cyclo-hexane. Other suitable bivalent alcohols are, for example, the polyoxyalkylene glycols with (2-100) units derived from ethylene glycol, propylene glycol, 1,2 butanediol and 1,4 butanediol such as, for instance, diethylene glycol, triethylene glycol, tetraethylene glycol, dipropylene glycol, tripropylene glycol, dibutylene glycol, tributylene glycol and higher polyoxyalkylene glycols.

Other suitable diols are diols containing an aromatic ring such as, for instance, 1,4-bis(hydroxymethyl)benzene and hydroxy-terminal polylactones with molecular weights of between 200 and 1000 such as, for instance, polycaprolactone.

The phosphorus-containing compounds are preferably compounds according to formulas $(ABO)_2PO(OH)$, $(ABO)PO(OH)_2$ or a mixture thereof, wherein A is derived from acrylic acid, methacrylic acid or crotonic acid and B is derived from a branched or non-branched bivalent aliphatic alcohol with 2-6 carbon atoms. Examples are the mono-di-phosphate esters of hydroxyethyl (meth)acrylate, hydroxyethyl crotonate, 4-hydroxybutyl (meth)acrylate and 4-hydroxybutyl crotonate.

Preference is given to the use of reaction products of hydroxyethyl (meth)acrylate with $P_2O_5$ or to reaction products of hydroxyethyl (meth)acrylate and (1-10) ethylene oxide units or (1-6) propylene oxide units with $P_2O_5$.

In formula $(RO)(TO)PO(OH)$, the TO residue may be derived from an aliphatic monoalcohol with 6-22 carbon atoms such as, for instance, hexanol, n-octanol, capryl alcohol, lauryl alcohol, cetyl alcohol, isotridecyl alcohol and octadecyl alcohol. The TO residue may also be derived from a polyoxyalkylated alkylphenol with 7-30 C. atoms, or from a polyoxyalkylated higher alcohol with 6-22 C atoms. Examples of these are the condensation products with 1-40 moles ethylene oxide with 1 mole nonylphenol, dibutylphenol, dodecylphenol, dioctylphenol, lauryl alcohol, n-octanol and tridecyl alcohol. The TO-residue may further be derived also from a block copolymer of ethylene oxide with propylene oxide etherified at one end with a hydrocarbon residue with 1-15 carbon atoms or from such a monoetherified polypropylene glycol or other polyoxyalkylene glycol in which the oxyalkylene units contain at least 3 C atoms, for instance monomethoxyheptapropylene glycol.

TO is preferably derived from a higher alcohol or from a polyethylene oxide adduct of an alcohol or alkylphenol.

The RO group may be derived from a polymerizable unsaturated alcohol, such as for example allyl alcohol, crotonyl alcohol, cinnamyl alcohol, undecylene alcohol and vinyl alcohol. The RO group is preferably derived from a hydroxyalkyl ester or polyoxyalkylene ester of a polymerizable unsaturated carboxylic acid with 3-25 carbon atoms, such as acrylic acid, methacrylic acid and crotonic acid, a monoester of maleic acid, fumaric acid or itaconic acid with an aliphatic alcohol containing 1-20 carbon atoms, such as methanol, ethanol, butanol and hexanol.

Herein B is a bivalent residue derived from a diol. The diol may be a branched or non-branched aliphatic or cycloaliphatic diol with 2-20 carbon atoms or a polyoxyalkylenediol with 2-100, preferably 2-10, units derived from ethylene glycol, propylene glycol, 1,2-butylene glycol and 1,4-butylene glycol.

The diol may also contain aromatic groups or be a hydroxyl-terminal polylactone with a molecular weight of between 200 and 1000. The diol may, for instance, be ethylene glycol, propanediol 1,2, propanediol 1,3, butanediol 1,4, butanediol 1,2, decanediol 1,2, dodecanediol 1,2, hexanediol 1,5, 1,4-bis(hydroxylmethyl)cyclo-hexane, 1,4-bis(hydroxymethyl)benzene, hexanediol 1,2, diethylene glycol, triethylene glycol, dipropylene glycol, tetrapropylene glycol, dibutylene glycol, a higher polyoxyalkylene glycol and polycaprolactonediol. Preference is given to the use of emulsifiers with the formula $(RO)(TO)PO(OH)$, wherein RO is derived from a hydroxyalkyl ester of acrylic acid, methacrylic acid or crotonic acid, in which the branched or non-branched alkyl group has 2-6 carbon atoms, in the form of a reaction product as described above.

The phosphorus-containing compounds used as component c. can be obtained according to the processes described in U.S. Pat. No. 4,110,285 and U.S. Pat. No. 4,101,490.

The plastic dispersions may be aqueous as well as non-aqueous dispersions. Preference is given to the use of aqueous dispersions.

The plastic dispersions can be obtained by means of emulsion polymerizations known in the art.

The molecular weights of the dispersions can be analyzed by means of Gas Phase Chromatography (GPC), in which analyses the polymers are dissolved in tetrahydrofuran and filtered off over an 0.45 micrometer filter.

Three linear columns are used with polystyrene as standard. The dispersions normally show a virtually gaseous molecular weight distribution, the distribution being asymmetric with a range between 25,000 and 150,000 g/mole for the top of the greatest peak (calibrated with respect to narrow polystyrene standards). If the molecular weight is too high, the miscibility of the dispersion-coated pigment in plastics may be insufficient. In order to obtain the desired molecular weights, chain regulators such as, for instance, dodecyl mercaptan, carbon tetrachloride, n-butyl mercaptan and 2-mercaptoethanol may be necessary.

The plastic dispersion is mixed with a pigment paste in a ball mill or in a high-speed mixer. In such an aqueous paste, the pigment is contained in a finely distributed state with the desired particle size, which is preferably smaller than 5 um. The mixture, consisting of dispersion and pigment paste, can be dried by spray drying to form a pigment powder. The mixture consisting of dispersion and pigment paste can also be heated, causing coagulation. If necessary, the resulting product will be filtered, washed, dried, ground. In this manner, a particle coated with a plastic dispersion can be obtained.

The amount of pigment by weight (calculated on the amount of dispersion by weight) may vary within wide limits. The amount of pigment usually varies between 10 and 90% (wt) calculated on the total amount of coated pigment by weight. If inorganic pigments are used, these amounts are typically 50-75% (wt) pigment and 25-50% (wt) dispersion. If organic pigments are used, these amounts are normally 25-35% (wt) pigment and 65-75% (wt) dispersion.

If so desired, additives such as, for instance, metallic soaps, low-molecular polymers, waxes and/or liquid esters of dicarboxylic acids may be used also in order to obtain virtually dust-free, easy-to-use and easy-to-meter products (masterbatches). Examples of suitable metallic soaps are magnesium, calcium and zinc stearate. Examples of suitable liquid esters of dicarboxylic acids are the esters of aromatic dicarboxylic acids such as dioctylphthalate. Other suitable additives are, for instance, stearylamide, ethylenedistearyl-amide, silica, hydrogenated castor oil, esters of pentaery-thritol such as a monoester or tetraester of pentaerythritol, for instance an ester of a fatty acid with 12 to 18 carbon atoms. The above additives are described, for instance, in EP-A-290092 and EP-A-379751.

The amount of coated pigment particles or colorant particles ranges between about 0.1 and 20% (wt) calculated on the plastic. Suitable plastics are, for instance, polystyrene, ABS, PVC, polyesters, polyethylene, polypropylene, polycarbonate and polyethylene terephthalate.

The invention also comprises the mixtures based on these plastics and the coated organic and inorganic particles.

The pigments and colorants coated according to the invention can be used also in powder coatings, rubbers, insecticides, pharmaceutical products, paints, in the food industry, printing inks; films and laminates.

The pigment particles and colorant particles may be of an organic as well as an inorganic nature. The particle size is mostly between 0.01 $\mu$m and 100 $\mu$m. Examples of suitable inorganic pigments are $TiO_2$, ZnO, $Sb_2O_3$, ZrO, $BaSO_4/ZnS$, $TiO_2/CaSO_4$, $TiO_2/BaSO_4$, $Pb_3O_4$, CdS(Se), $Sb_2S_3$, HgS, $PbCrO_4$, $Pb(OH)_2$, $BaCrO_4$, $SrCrO_4$, $PbCrO_4$, PbO, $Cr_2O_3$, $(CO_3(PO_4)_2$, $Fe_4((Fe(CN)6)_3$, $CaO.CuO.4\ SiO_2$, $CuO.Al_2O_3$, 'metallic' pigment and carbon black.

Suitable organic pigments are, for instance, azo compounds and ultramarine blue.

Suitable pigments and colorants are described, for instance, in EP-A-104498.

The invention is elucidated by means of the following non-restrictive examples.

EXAMPLE I

Preparation of a plastic dispersion

A flask (of 2 litres) provided with a cooler, thermocoupler and stirrer was filled with 62 parts by weight demineralized water and 0.04 parts by weight sodium dodecylbenzenesulphonate.

This mixture was brought to 80° C.

Subsequently were added 0.35 part by weight ammoniumpersulphate as initiator and as a pre-emulsion: 99 parts by weight styrene, 0.15 part by weight dodecyl mercaptan, 3.5 parts by weight sodium dodecylbenzenesulphonate, 1 part by weight mono-di-phosphate ester of hydroxyethyl (meth)acrylate and 30 parts by weight demineralized water.

After metering the pre-emulsion for three hours, the temperature was raised to 85° C., while simultaneously metering for one hour a solution of 0.15 grams ammonium persulphate in 3.1 grams demineralized water. After 2 hours at 85° C., the flask was cooled, filtered and drained.

EXAMPLE II

The process according to Example I was repeated, with 15 parts by weight methyl methacrylate and 84 parts by weight styrene being incorporated instead of 99 parts by weight styrene.

EXAMPLE III

The process according to Example I was repeated, with 25 parts by weight butyl acrylate and 74 parts by weight styrene being incorporated instead of 99 parts by weight styrene.

COMPARATIVE EXPERIMENT A

The process according to Example I was repeated, with 2 parts by weight acrylic acid and 97 parts by weight styrene being incorporated instead of 99 parts by weight styrene.

COMPARATIVE EXPERIMENT B

The process according to Example I was repeated, with 3 parts by weight methacrylic acid and 96 parts by weight styrene being incorporated instead of 99 parts by weight styrene.

TABLE I

| | parts by weight | | | | |
|---|---|---|---|---|---|
| Dispersion according to Example | I | II | III | A | B |
| demineralized water | 62 | 62 | 62 | 62 | 62 |
| sodium dodecylbenzenesulphonate | 0.04 | 0.04 | 0.04 | 0.04 | 0.04 |
| styrene | 99 | 84 | 74 | 97 | 96 |
| methyl methacrylate | | 15 | | | |
| butyl acrylate | | | 25 | | |
| acrylic acid | | | | 2 | |
| methacrylic acid | | | | | 3 |
| dodecyl mercaptan | 0.15 | 0.15 | 0.15 | 0.15 | 0.15 |
| sodium dodecylbenzenesulphonate | 3.5 | 3.5 | 3.5 | 3.5 | 3.5 |
| mono-di-phosphate ester of hydroxylethyl methacrylate | 1 | 1 | 1 | 1 | 1 |
| demineralized water | 30 | 30 | 30 | 30 | 30 |

EXAMPLE IV

Preparation of a pigment paste 3.85 parts by weight propylene glycol, 1.40 parts by weight water, 0.85 part by weight dispersant (Orotan 731 SD TM, 25% solution, Rohm and Haas), 0.10 part by weight dispersant (Surfynol 104E TM, Air Products), 0.10 part by weight antifoamer (Agitan 703 TM, Munzing Chemie) and 19.70 parts by weight titanium dioxide (Kronos 2190 TM, Kronos Titan) were mixed and, using a ball mill or pearl mill, ground to a Hegman fineness lower than 5 (ASTM-D-1210-79).

EXAMPLE V

Preparation of a pigment paste 125 parts by weight water, 20 parts by weight ethylene glycol, 45 parts by weight dispersant (SER AD FA ® 620 TM, Servo) and 235 parts by weight pigment (Helio Blue 6900 TM) were brought to the required particle size by means of a ball mill. 200 parts by weight styrene-acrylate dispersion (50% water), 5 parts by weight calciumstearate dispersion (50% water) and 25 parts by weight 2% by weight aqueous hydroxyethyl cellulose solution were added to the above mixture, and well stirred. This pigment paste was subjected to spray drying and contained 65% by weight Helio Blue (dry on dry).

EXAMPLE VI 50 parts by weight of 50% aqueous solutions of the plastic dispersions according to Examples I-III and Comparative Experiments A-B were mixed in a high-speed mixer with 83 parts by weight pigment paste according to Example IV. The result was that TiO$_2$ was coated with the dispersion.

EXAMPLE VII 10 parts by weight of the TiO$_2$, coated according to Example VI, were mixed in an extruder with 20 parts by weight polycarbonate.

After a visual determination, it was found that TiO$_2$ coated with dispersions according to any one of examples 1-3 showed a good homogeneous distribution in the polycarbonate.

On the other hand, the experiments based on TiO$_2$, coated with dispersions according to any one of Comparative Experiments A-B, showed many agglomerates.

EXAMPLE VIII 50 parts by weight of 50% aqueous solutions of plastic dispersions according to Examples I-III and Comparative Experiments A-B were mixed in a high-speed mixer with 106 parts by weight of this pigment paste according to Example V, 1.25 parts by weight calcium stearate 50% and 6.25 parts by weight 2% hydroxyethyl cellulose solution. The result was that the pigment was coated with the dispersions. Subsequently, this mixture was dried by spray drying to form a dust-free powder.

EXAMPLE IX 10 parts by weight of the pigment coated according to Example VIII were mixed in an extruder at 150° C. with 200 parts by weight polystyrene.

After a visual determination, it was found that 'helio blue' coated with dispersions according to any one of Examples I-III showed a good homogeneous distribution in the polystyrene.

On the other hand, the experiments with 'helio blue' coated with dispersions according to any one of Comparative Experiments A-B showed many agglomerates.

What is claimed is:

1. A method of coating inorganic and organic particles with a dispersion which comprises:
   i) forming a plastic dispersion comprising a polymer based on
      a. a vinyl monomer,
      b. at least one member selected from the group consisting of (C$_1$-C$_{12}$) alkyl (meth)acrylate, (C$_1$-C$_{12}$) dialkylitaconate, (C$_1$-C$_{12}$) dialkylfumarate, (C$_1$-C$_{12}$) dialkylmaleate and mixtures thereof,
      c. a phosphorous-containing compound comprising (i) at least one compound having a formula (RO)$_2$PO(OH) or (RO)PO(OH)$_2$, or (ii) at least one compound having the formula (RO)(TO)PO(OH),
   wherein the R is an alcohol residue derived from an unsaturated polymerizable alcohol having 2-12 carbon atoms, an AB group, wherein A is a an acid residue derived from an unsaturated polymerizable carboxylic acid having 3-25 carbon atoms and wherein B represents a bivalent residue derived from a diol, and wherein TO represents a residue derived from at least one member selected from the group consisting of branched or non-branched aliphatic alcohols having 6-22 carbon atoms, polyoxyalkylated alkylphenols having 7-30 carbon atoms, an addition product of ethylene oxide with an alcohol having 6-22 carbon atoms, and an addition product of an alkylene oxide having at least 3 carbon atoms with an alcohol having 1-15 carbon atoms; and
      d. 0-0.3% (wt) at least one member selected from the group consisting of organic unsaturated mono carboxylic acid and dicarboxylic acid; and
   ii) contacting said inorganic and organic particles with said dispersion in order to form coated particles.

2. A method according to claim 1 wherein the plastic dispersion is a dispersion of a polymer based on
   a. 50-99% (wt) vinyl monomer,
   b. 0-50% (wt) of a member selected from the group consisting of (C$_1$-C$_{12}$) alkyl (meth)acrylate, (C$_1$-C$_{12}$) alkylitaconate, (C$_1$-C$_{12}$) dialkylfumarate, (C$_1$-C$_{12}$) dialkylmaleate and mixtures thereof, and
   c. 0.1-5% (wt) of the phosphorous-containing compound.

3. The method of claim 1 wherein
   d. is present in the said polymer in an amount of about 0 wt %.

4. The method of claim 1 wherein the vinyl monomer used is styrene.

5. The method of claim 1 wherein the (C$_1$-C$_{12}$) alkyl (meth)acrylate is methyl (meth)acrylate.

6. The method of claim 1 wherein component c. is selected from the group consisting of phosphate ester of hydroxyethyl (meth)acrylate, hydroxyethyl crotonate, 4-hydroxybutyl (meth)acrylate, 4-hydroxybutyl crotonate or a mixture thereof.

7. Inorganic or organic particles coated with a plastic dispersion of claim 1.

8. The method of claim 1 wherein said inorganic and organic particles are selected from the group consisting of pigment particles and colorant particles.

* * * * *